(12) United States Patent
Morrison

(10) Patent No.: US 9,302,607 B1
(45) Date of Patent: Apr. 5, 2016

(54) STRAP HOLDERS FOR PALLETIZED CARGO

(71) Applicant: Alfred B. Morrison, Fort Worth, TX (US)

(72) Inventor: Alfred B. Morrison, Fort Worth, TX (US)

(\*) Notice: Subject to any disclaimer, the term of this patent is extended or adjusted under 35 U.S.C. 154(b) by 0 days.

(21) Appl. No.: 14/793,310

(22) Filed: Jul. 7, 2015

Related U.S. Application Data

(60) Provisional application No. 62/021,765, filed on Jul. 8, 2014.

(51) Int. Cl.
  *B60P 7/08* (2006.01)
  *B60P 7/12* (2006.01)
  *B60P 7/135* (2006.01)

(52) U.S. Cl.
  CPC .............. *B60P 7/12* (2013.01); *B60P 7/0869* (2013.01); *B60P 7/135* (2013.01)

(58) Field of Classification Search
  CPC ........... B60P 7/135; B60P 7/12; B60P 7/0869
  USPC ......... 410/33, 36, 40, 41, 47, 48, 49, 99, 120, 410/154, 155; 206/453, 586, 593
  See application file for complete search history.

(56) References Cited

U.S. PATENT DOCUMENTS

| 4,526,500 A * | 7/1985 | Patrick | B60P 7/16 410/47 |
| 8,322,956 B2 * | 12/2012 | Strang | B60P 7/12 410/155 |

\* cited by examiner

*Primary Examiner* — Stephen Gordon
(74) *Attorney, Agent, or Firm* — Kenneth L. Tolar

(57) ABSTRACT

Strap holders for palletized cargo include one or more blocks, each having an upper surface, a lower surface, a front face and a vertical rear face. The front face includes an arcuate cavity that is dimensioned and configured to tightly conform to the upper rim of a given storage container. The vertical rear face includes a notch that is dimensioned to receive a cargo strap. As the strap is tightened around a container, each block cavity tightly grips the container rim while the notch prevents the strap from shifting or releasing.

4 Claims, 2 Drawing Sheets

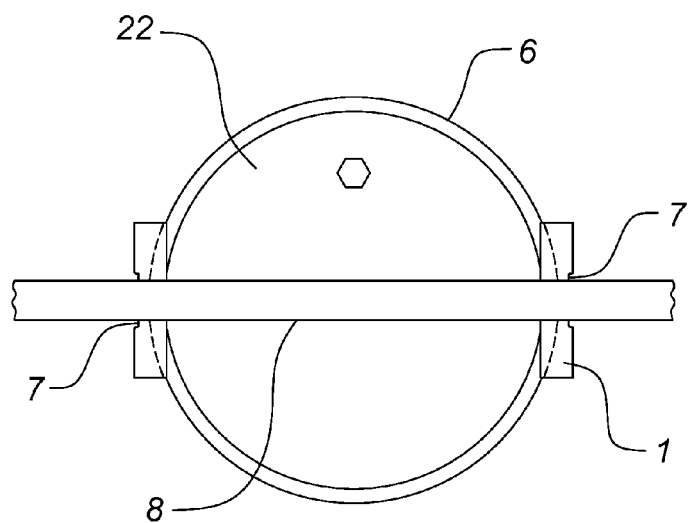
Fig. 1
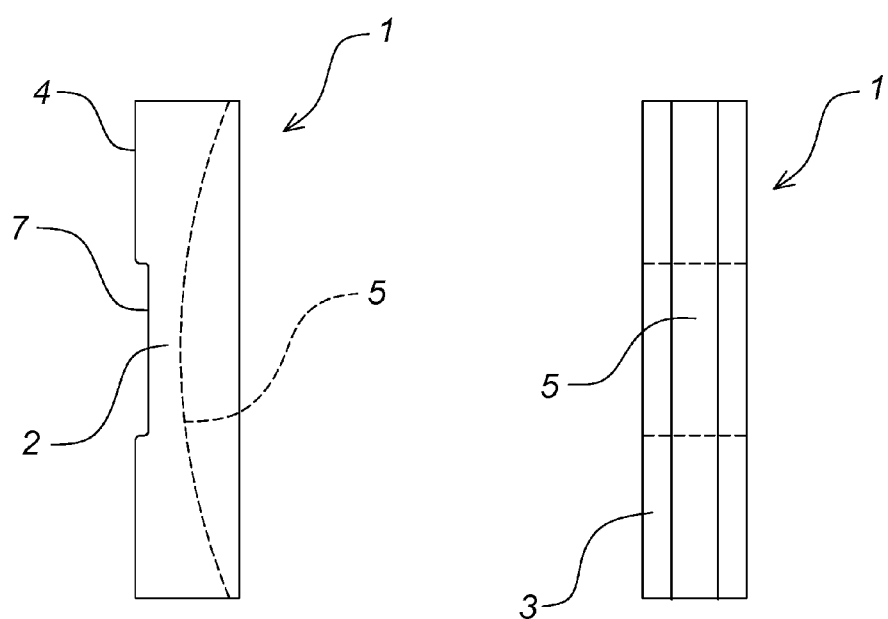
Fig. 2                    Fig. 3

STRAP HOLDERS FOR PALLETIZED CARGO

CROSS REFERENCE TO RELATED APPLICATIONS

This application is entitled to the benefit of provisional patent application No. 62/021,765 filed on Jul. 8, 2014, the specification of which is incorporated herein by reference.

BACKGROUND OF THE INVENTION

The present invention relates to a pair of blocks that firmly secure a ratcheting strap to palletized fluid containers.

DESCRIPTION OF THE PRIOR ART

Many liquid commodities are transported in drums or other cylindrical containers that are secured to a pallet with ratcheting straps. A liquid-filled container is extremely heavy and, therefore, poses a significant safety risk if unsecured. During transport, the containers often shift and dislodge the straps, creating a severely hazardous situation for the driver and other motorists. The unsecured container can fall off the pallet and damage a truck bed, or can be ejected onto the roadway and struck by an oncoming vehicle. The potential hazard is further exacerbated if the liquid material is toxic or environmentally hazardous.

Accordingly, there is currently a need for a device that secures a liquid container to a pallet. The present invention addresses this need by providing a pair of blocks that firmly secure a cargo strap to an upper end of a chemical container.

SUMMARY OF THE INVENTION

The present invention relates to strap holders for palletized cargo comprising one or more blocks, each having a horizontal upper surface, a lower surface, a front face and a vertical rear face. The front face includes an arcuate cavity that is dimensioned and configured to tightly conform to the upper rim of a given storage container. The vertical rear face includes a notch that is dimensioned to receive a cargo strap. As the strap is tightened around a container, each block cavity tightly grips the container rim while the notch prevents the strap from shifting or releasing.

It is therefore an object of the present invention to provide a device that firmly secures cargo to a pallet.

It is another object of the present invention to provide uniquely designed blocks that anchors a restraining strap to palletized liquid containers.

Other objects, features, and advantages of the present invention will become readily apparent from the following detailed description of the preferred embodiment when considered with the attached drawings and the appended claims.

BRIEF DESCRIPTION OF THE DRAWINGS

FIG. 1 is a top view of a liquid container with the strap holders according to the present invention secured thereto.

FIG. 2 is a top view of an exemplary block.

FIG. 3 is a front view of the block of FIG. 2.

DESCRIPTION OF THE PREFERRED EMBODIMENT

Figure 4:
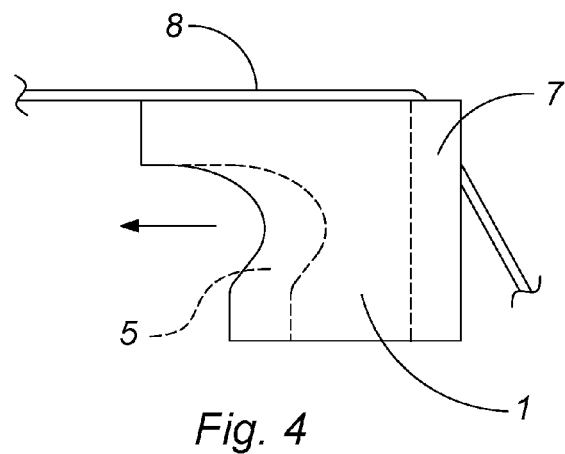
FIG. 4 is a side view of a block with a cargo strap partially positioned within a notch.
Figure 5:
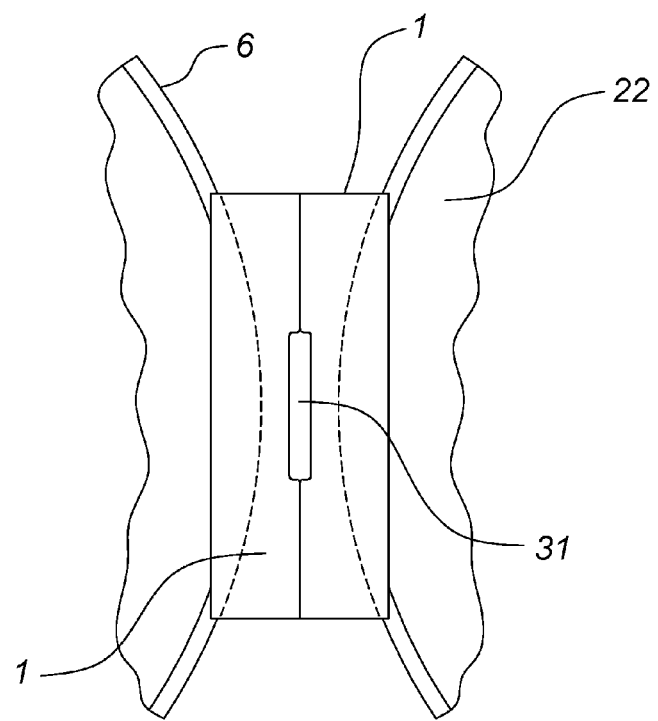
FIG. 5 is a top view of a pair of blocks secured between juxtaposed liquid containers.

The present invention relates to strap holders for palletized cargo comprising one or more blocks 1, each having a horizontal, planar upper surface 2, a lower surface, a front face 3 and a vertical rear face 4. The front face includes an arcuate cavity 5 that is dimensioned and configured to tightly conform to the upper rim 6 of a given storage container 22, such as a chemical drum. The rear face includes a vertical notch 7 that is dimensioned to receive and secure a cargo strap 8. The planar upper surface allows the cargo strap to easily extend over the upper end of the container to a second block on an opposing portion of the rim, as depicted in FIG. 1. Furthermore, the vertical rear faces allow a pair of blocks to be positioned between two immediately adjacent containers so that each notch combines with the other to form a channel 31 that simultaneously accommodates two straps. Therefore, when the two straps are tightened, the two contiguous, mutually engaging blocks further stabilize the containers, as depicted in FIG. 5.

Accordingly, a block is positioned on each of two opposing portions of the upper rim and a cargo strap is extended across the top end of the container. The strap is seated within the vertical notch on each block and is tightened in a conventional fashion. As the strap is tightened, the block cavities tightly grip the container rim while the notches prevent the strap from shifting or releasing during transport.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A system for securing palletized cargo comprising:
   a first storage container including an upper end bordered by a peripheral rim;
   a first block having an upper surface, a front face and a vertical rear face, said front face having an arcuate cavity tightly conforming to the peripheral rim of said storage container, said rear face having a notch thereon;
   a first cargo strap secured around said first storage container, said first cargo strap having a portion received within said notch to prevent said cargo strap from shifting.

2. The system according to claim 1 further comprising a second block having an upper surface, a front face and a vertical rear face, said front face on said second block having an arcuate cavity tightly conforming to the peripheral rim of said first storage container, on a side opposite said first block, said rear face on said second block having a notch receiving another portion of said first cargo strap.

3. The system according to claim 2 wherein the upper surface of said first block and the upper surface of said second block are planar to allow the cargo strap to easily pass over the upper end of said storage container, and between said first block and said second block, with minimal interference.

4. The system according to claim 1 further comprising:
   a second block having an upper surface, a front face and a vertical rear face, said front face of said second block having an arcuate cavity tightly conforming to the peripheral rim of a second storage container that is positioned adjacent to said first storage container, the rear face of said second block having a notch;

a second cargo strap secured around said second storage container, said second cargo strap having a portion received within the notch on said second block to prevent said second cargo strap from shifting, wherein the notch on the vertical rear face of said first block combines with the notch on the vertical rear face of said second block to form a channel that simultaneously accommodates said first cargo strap and said second cargo strap, and so that said first block and said second block are firmly engaged to stabilize said first container said second container.

* * * * *